(12) United States Patent
Togashi

(10) Patent No.: US 12,394,339 B2
(45) Date of Patent: Aug. 19, 2025

(54) DISPLAY DEVICE

(71) Applicant: Sharp Display Technology Corporation, Kameyama (JP)

(72) Inventor: Yasuyuki Togashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 153 days.

(21) Appl. No.: 18/273,378

(22) PCT Filed: Feb. 1, 2021

(86) PCT No.: PCT/JP2021/003502
§ 371 (c)(1),
(2) Date: Jul. 20, 2023

(87) PCT Pub. No.: WO2022/162933
PCT Pub. Date: Aug. 4, 2022

(65) Prior Publication Data
US 2024/0096244 A1 Mar. 21, 2024

(51) Int. Cl.
*G06F 1/16* (2006.01)
*G09F 9/30* (2006.01)

(52) U.S. Cl.
CPC ............ *G09F 9/301* (2013.01); *G06F 1/1616* (2013.01); *G06F 1/1641* (2013.01); *G06F 1/1681* (2013.01)

(58) Field of Classification Search
CPC .......... G09F 9/301; G09F 9/30; G06F 1/1616; G06F 1/1641; G06F 1/1681; G06F 1/1652
See application file for complete search history.

(56) References Cited

U.S. PATENT DOCUMENTS

| | | | | |
|---|---|---|---|---|
| 10,243,607 B2* | 3/2019 | Yang | ...................... | G06F 1/1652 |
| 10,448,522 B2* | 10/2019 | Han | ........................ | H05K 1/028 |
| 10,727,435 B2* | 7/2020 | Kim | ...................... | G06F 1/1601 |
| 10,831,234 B1* | 11/2020 | Watamura | ............. | G06F 1/1652 |
| 10,955,880 B2* | 3/2021 | Wang | .................. | H04M 1/0216 |
| 11,016,530 B2* | 5/2021 | Watamura | ............. | G06F 1/1652 |
| 11,194,366 B2* | 12/2021 | Cheng | ................... | G06F 1/1626 |
| 11,223,710 B2* | 1/2022 | Cheng | ................. | H04M 1/0268 |
| 11,258,035 B2* | 2/2022 | Kim | ...................... | G06F 1/1652 |
| 11,268,565 B2* | 3/2022 | Bae | ........................ | G06F 1/1652 |
| 11,474,570 B2* | 10/2022 | Lee | ....................... | G06F 1/1652 |
| 11,523,523 B2* | 12/2022 | Han | ...................... | G06F 1/1681 |
| 11,553,613 B2* | 1/2023 | Sim | ........................ | G09F 9/301 |
| 11,582,876 B2* | 2/2023 | Ko | ......................... | G06F 1/1681 |
| 11,792,946 B2* | 10/2023 | Park | ...................... | G06F 1/1681 361/679.01 |
| 11,846,991 B2* | 12/2023 | Feng | ..................... | G06F 1/1637 |
| 11,868,182 B2* | 1/2024 | Cui | ...................... | G06F 1/1681 |
| 11,889,008 B2* | 1/2024 | Kang | ................... | G06F 1/1681 |
| 12,032,413 B2* | 7/2024 | Kee | ...................... | G06F 1/1652 |
| 2015/0233162 A1* | 8/2015 | Lee | ........................ | H04M 1/022 16/223 |
| 2015/0378397 A1 | 12/2015 | Park et al. | | |

(Continued)

FOREIGN PATENT DOCUMENTS

JP 2019-028467 A 2/2019

*Primary Examiner* — Rockshana D Chowdhury
(74) *Attorney, Agent, or Firm* — ScienBiziP, P.C.

(57) ABSTRACT

Undulation on a front surface of a display panel is reduced. A display device includes a pulling member provided to back surface of a display panel, and pulling a second portion in a second state in which the display panel is unfolded.

11 Claims, 11 Drawing Sheets

(56) References Cited

U.S. PATENT DOCUMENTS

| | | |
|---|---|---|
| 2018/0070460 A1 | 3/2018 | Han |
| 2018/0107250 A1* | 4/2018 | Cho ..................... G06F 1/1652 |
| 2019/0036068 A1 | 1/2019 | Kim et al. |
| 2020/0321551 A1 | 10/2020 | Kim et al. |
| 2022/0058993 A1* | 2/2022 | Zhao ................... H04M 1/0268 |
| 2023/0343250 A1* | 10/2023 | Kim ....................... G09F 9/301 |

* cited by examiner

FIRST STATE

SECOND STATE

CROSS-SECTION
TAKEN ALONG LINE A-A

DISPLAY DEVICE

TECHNICAL FIELD

The disclosure relates to a display device.

BACKGROUND ART

There are known foldable display devices. Patent Document 1 discloses a foldable display device including a flexible display. In folding the display device, the display panel is folded into a tear-drop shape.

Note that when the display panel is folded into a tear-drop shape, a first portion of the display panel corresponding to the folding portion and the vicinity of the folding portion is bent so that a front surface of the display panel faces inwards, and a second portion of the display panel extending from the first portion is bent so that the front surface of the display panel faces backwards (that is, the back surface of the display faces inwards). Note that the front surface of the display panel corresponds to a display surface.

CITATION LIST

Patent Literature

[Patent Document 1] United States Patent Application Publication No. 2015/0378397

SUMMARY

Technical Problem

When the display panel is folded into a tear-drop shape, the second portion of the display panel might have a distortion swelling on the front surface of the display panel. As a result, the front surface of the display panel might suffer undulation.

Solution to Problem

A display device according to an aspect of the disclosure includes: a display panel that is flexible and has a front surface and a back surface, the display panel having: a first portion bent so that the front surface faces inwards in a first state in which the display panel is folded; and a second portion positioned outside the first portion while the first portion is positioned in a center; and a pulling member provided to the back surface of the display panel, and pulling the second portion in a second state in which the display panel is unfolded.

Advantageous Effects of Disclosure

An aspect of the disclosure can reduce undulation on a front face of a display panel.

BRIEF DESCRIPTION OF DRAWINGS

FIG. 9 corresponds to FIG. 6.

FIG. 12 shows transition from a first state to a second state.

DESCRIPTION OF EMBODIMENTS

Embodiments of the disclosure will be described below. For convenience in description, like reference signs designate members having identical functions throughout the description. These members might not be elaborated upon repeatedly.

First Embodiment

Figure 1:
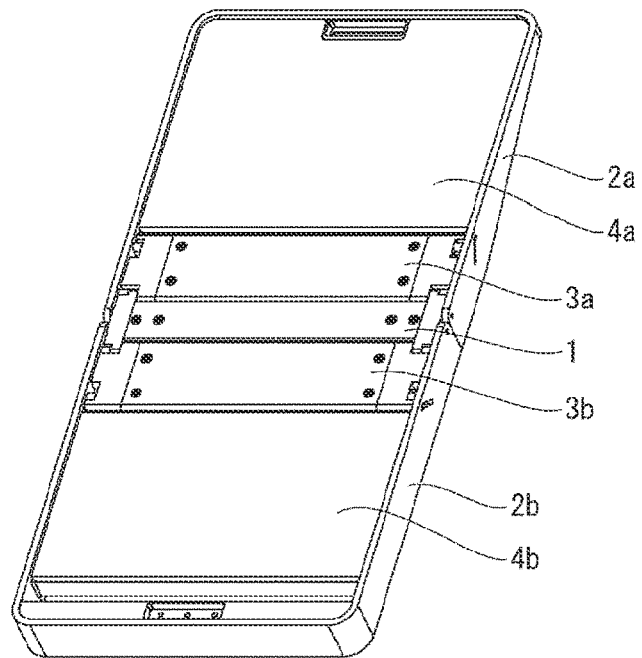
FIG. 1 is a perspective view of a casing unit according to a first embodiment of the disclosure.
Figure 2:
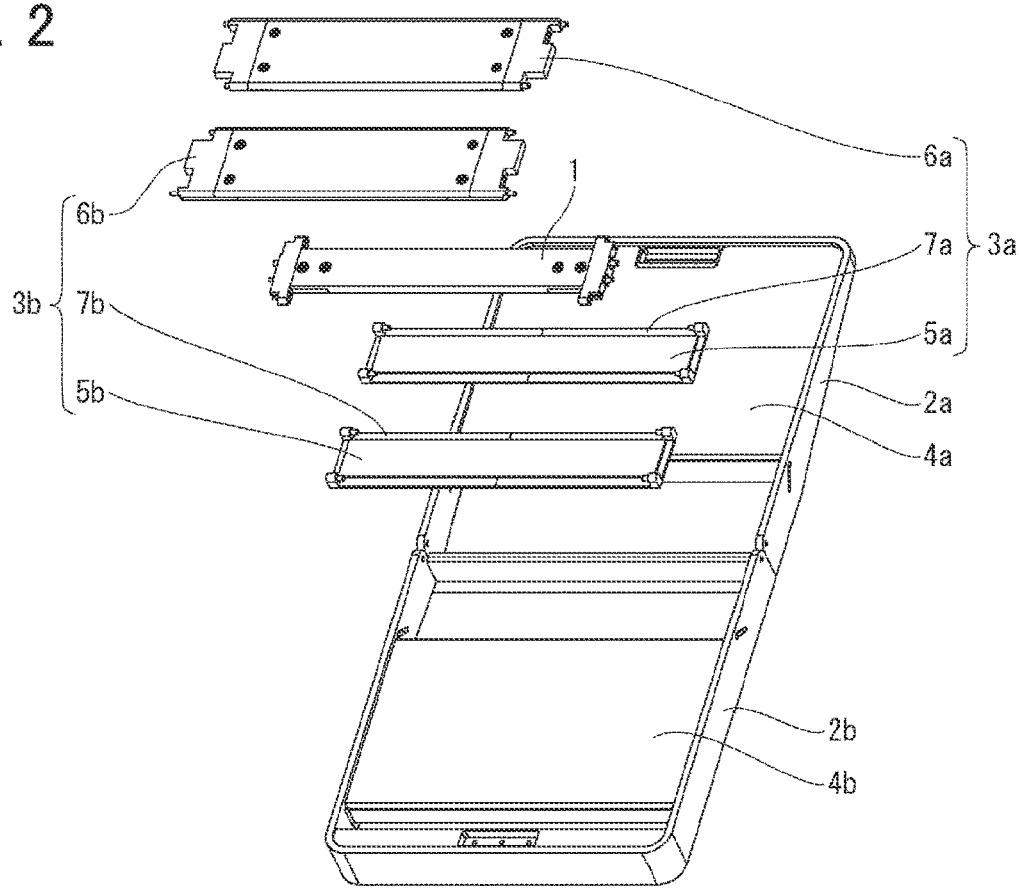
FIG. 2 is an exploded perspective view of the casing unit according to the first embodiment of the disclosure.
Figure 3:
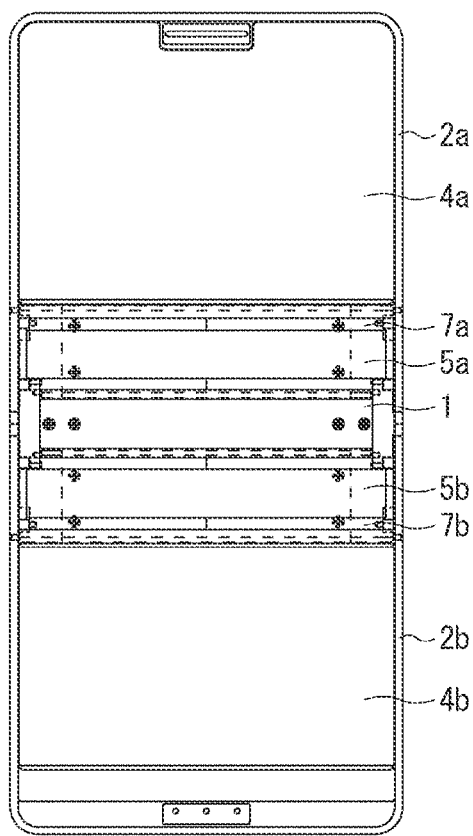
FIG. 3 is a plan view of the casing unit in FIG. 1 with no lifter.

FIG. 1 is a perspective view of a casing unit 111 according to a first embodiment of the disclosure. FIG. 2 is an exploded perspective view of the casing unit 111 according to the first embodiment of the disclosure. FIG. 3 is a plan view of the casing unit 111 in FIG. 1 with neither a lifter 6a nor a lifter 6b.

The casing unit 111 includes: a hinge member 1; a first casing 2a; a second casing 2b; magnet systems 3a and 3b; and display panel attaching members 4a and 4b.

The casing unit 111 includes: the hinge member 1; and the first casing 2a and the second casing 2b sandwiching the hinge member 1 and connected together with the hinge member 1. The first casing 2a houses the magnet system 3a and the display panel attaching member 4a in the stated order from toward the hinge member 1. The second casing 2b houses the magnet system 3b and the display panel attaching member 4b in the stated order from toward the hinge member 1.

The magnet system 3a has: a magnet 5a; the lifter 6a; and a magnet holder 7a. The magnet system 3b has: a magnet 5b; the lifter 6b; and a magnet holder 7b. The magnet 5a and the magnet 5b are respectively housed in the magnet holder 7a and the magnet holder 7b. The magnet systems 3a and 3b will be described later in more detail.

The display panel attaching members 4a and 4b are bases to which a display panel 8 to be described later is secured.

Using the hinge member 1 as a folding portion, the casing unit 111 is foldable in a manner that an upper surface of the display panel attaching member 4a and an upper surface of the display panel attaching member 4b face each other.

FIG. 3 shows that the magnet 5a is provided across the first casing 2a in a direction substantially parallel with the upper surface of the display panel attaching member 4a and substantially perpendicular (a horizontal direction in the drawing) to a direction in which the hinge member 1 and the first casing 2a are arranged. Likewise, FIG. 3 shows that the magnet 5b is provided across the second casing 2b in a direction substantially parallel with the upper surface of the display panel attaching member 4b and substantially perpendicular (a horizontal direction in the drawing) to a direction in which the hinge member 1 and the first casing 2b are arranged.

Figure 4:
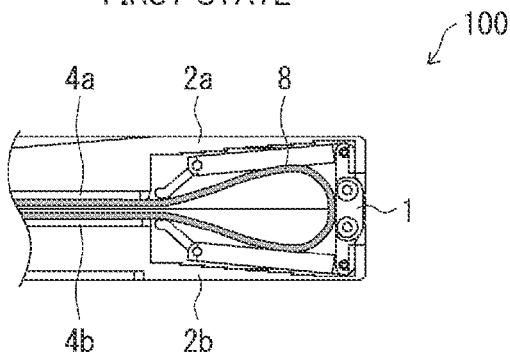
FIG. 4 illustrates a mechanism of how a surface of a display panel undulates in a foldable display device.
Figure 4:
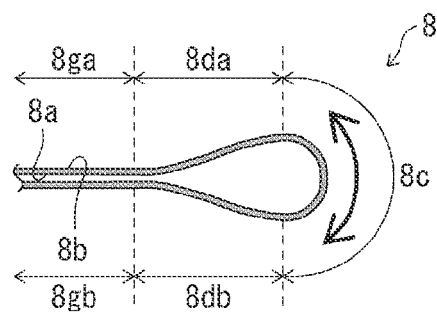
Figure 4:
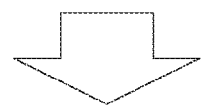
Figure 4:
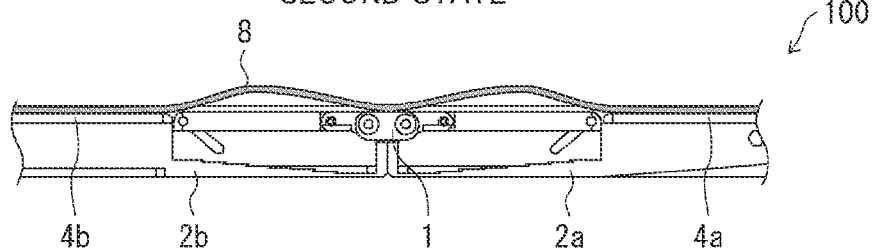
Figure 4:
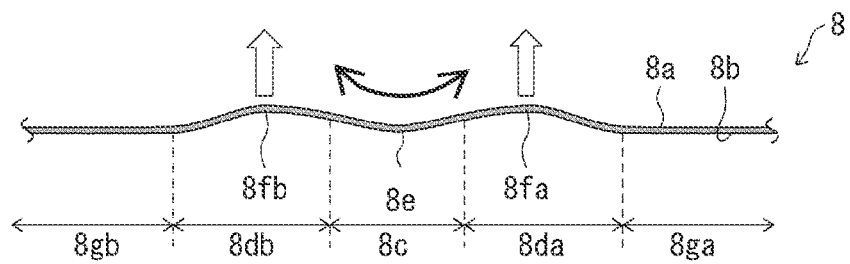

FIG. 4 illustrates a mechanism of how a front surface 8a of the display panel 8 undulates in a display device 100 that is foldable. For simplicity of illustration, FIG. 4, and furthermore, FIGS. 7, 8, and 12 to be shown later, include drawings of the display device along with drawings of the display panel 8 included in the display device.

The display device 100 includes: the hinge member 1; the first casing 2a; the second casing 2b; the display panel attaching members 4a and 4b; and the display panel 8.

The display panel 8 has the front surface 8a and a back surface 8b. Note that the front surface 8a is a display surface of the display panel 8, and the back surface 8b is a back side of the display surface. The display panel 8 is flexible. The display panel 8 has: a first portion 8c; and second portions 8da and 8db. The display panel 8 has the two second portions 8da and 8db sandwich the first portion 8c. Each of the second portions 8da and 8db is positioned outside the first portion 8c while the first portion 8c is positioned in the center.

The display panel 8 is disposed from above the first casing 2a through above the hinge member 1 to above the second casing 2b. The first portion 8c is positioned above the hinge member 1. The second portion 8da (one of the two second portions) is positioned above the first casing 2a. The second portion 8db (an other one of the two second portions) is positioned above the second casing 2b. The back surface 8b and a securing position 8ga (further outside the second portion 8da while the first portion 8c is positioned in the center) are secured to the upper surface of the display panel attaching member 4a. The back surface 8b and a securing position 8gb (further outside the second portion 8db while the first portion 8c is positioned in the center) are secured to the upper surface of the display panel attaching member 4b. The display panel 8 can be secured to the display panel attaching members 4a and 4b with either an adhesive, or a double-sided tape.

FIG. 4 shows a first state in which the display panel 8 is folded and a second state in which the display panel 8 is unfolded. Moreover, FIG. 4 shows a case where the display panel 8 is folded into a tear-drop shape. Here, in the first state, the first portion 8c is bent so that the front surface 8a faces inwards, while each of the second portions 8da and 8db is bent so that the back surface 8b faces inwards.

Typically, the display device 100 is often stored in the first state. When the display device 100 is in the first state for a long time, and, after that, the display device 100 shifts from the first state to the second state, the first portion 8c forms a distortion 8e dipping on the front surface 8a, the second portion 8da develops a distortion 8fa swelling on the front surface 8a, and the second portion 8db forms a distortion 8fb swelling on the front surface 8a. Hence, in the second state, the distortions 8e, 8fa and 8fb cause undulation of the front surface 8a.

Note that the display panel 8 may be folded into, for example, a U-shape. In this case, in the first state, each of the second portions 8da and 8db is bent so that the back surface 8b does not face inwards. Here, in the first state, each of the second portions 8da and 8db does not have to be bent so that the back surface 8b face inwards. In the first state, even if each of the second portions 8da and 8db is bent so that the back surface 8b does not bent inwards, the distortions 8fa and 8fb could form.

Figure 5:
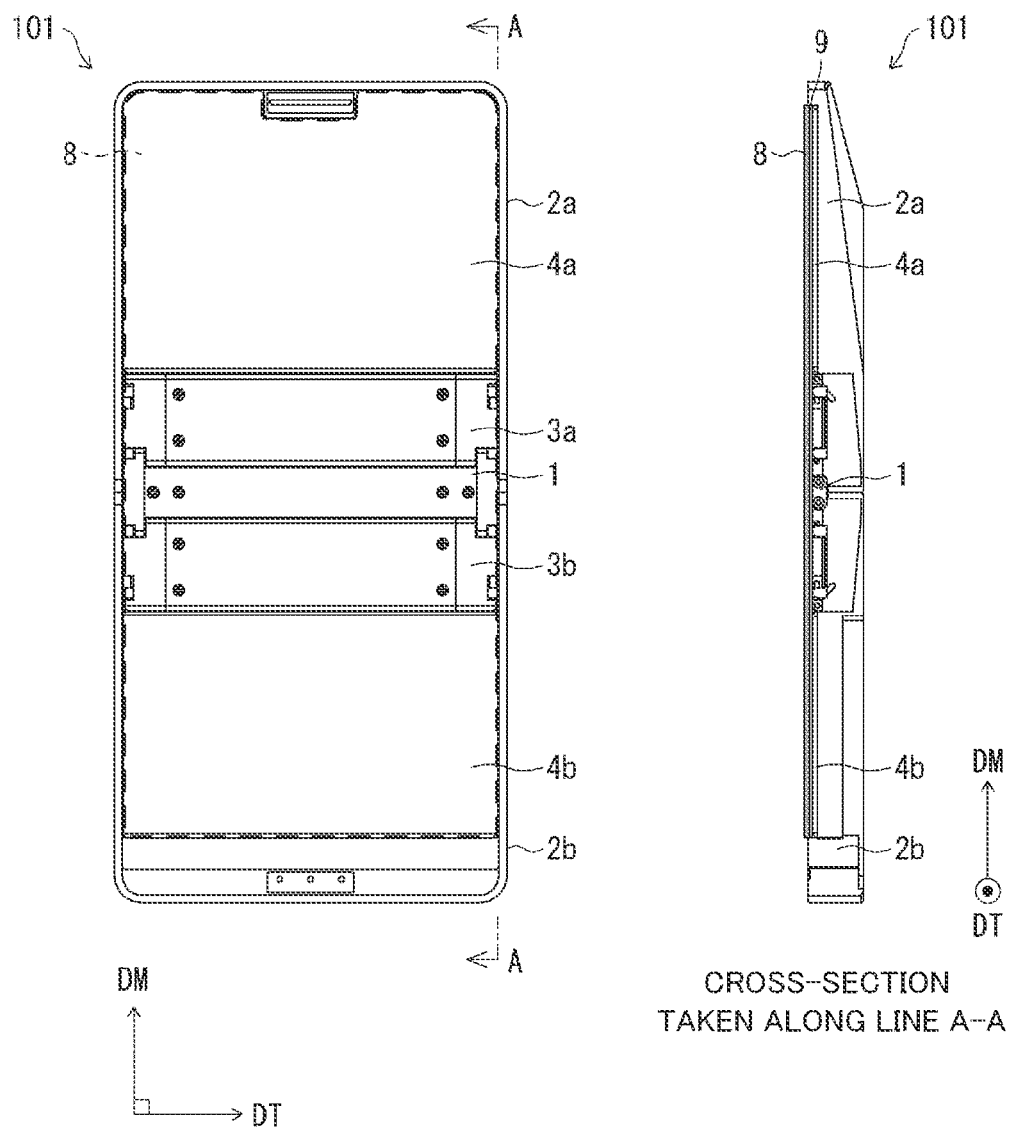
FIG. 5 illustrates a plan view, and a cross-sectional view taken along line A-A, of the display device according to the first embodiment of the disclosure.
Figure 6:
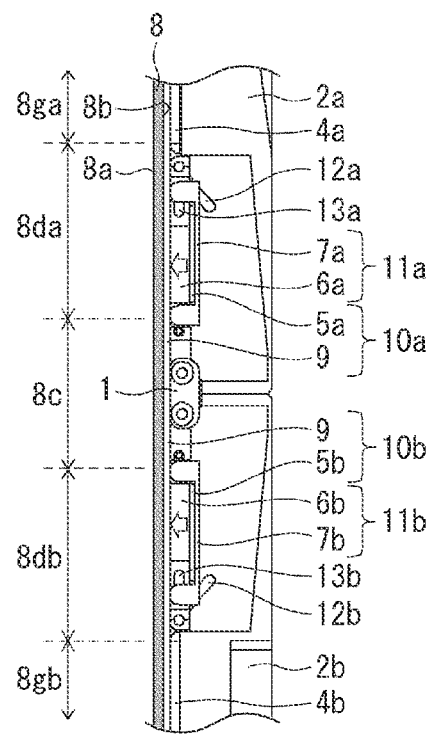
FIG. 6 is an enlarged cross-sectional view mainly illustrating a pulling member and a magnet moving member of the display device according to the first embodiment of the disclosure.

FIG. 5 illustrates a plan view, and a cross-sectional view taken along line A-A, of a display device 101 according to the first embodiment of the disclosure. FIG. 6 is an enlarged cross-sectional view mainly illustrating pulling members 10a and 10b, and magnet moving members 11a and 11b, of the display device 101 according to the first embodiment of the disclosure. The display device 101 includes: a casing unit 111; and the display panel 8.

The display panel 8 is disposed from above the first casing 2a through above the hinge member 1 to above the second casing 2b. The first portion 8c is positioned above the hinge member 1. The second portion 8da is positioned above the first casing 2a. The second portion 8db is positioned above the second casing 2b. The back surface 8b and the securing position 8ga are secured to the upper surface of the display panel attaching member 4a, and the back surface 8b and the securing position 8gb are secured to the upper surface of the display panel attaching member 4b. The display panel 8 can be secured to the display panel attaching members 4a and 4b with either an adhesive, or a double-sided tape.

The back surface 8b and the second portion 8da, and the back surface 8b and the second portion 8db, are provided with a ferromagnetic material 9. The ferromagnetic material 9 is secured to the entire back surface 8b. A combination of the ferromagnetic material 9 and the magnet 5a is the pulling member 10a, and a combination of the ferromagnetic material 9 and the magnet 5b is the pulling member 10b.

The ferromagnetic material 9 is made of, for example, a metal such as SUS430. The ferromagnetic material 9 is, for example, a plate-like member. When the ferromagnetic material 9 is a plate-like member, the ferromagnetic material 9 has a thickness of: preferably 0.03 mm or less if a living hinge is not provided; and preferably 0.5 mm or less if a living hinge is provided. The living hinge will be described later.

Note that, in the plan view of the display device 101 illustrated in FIG. 5, the outline of the display panel 8 is drawn by broken lines in order to avoid hiding most of the casing unit 111 behind the display panel 8.

The magnets 5a and 5b are provided to the back surface 8b. More specifically, the magnets 5a and 5b are provided across the ferromagnetic material 9 from the back surface 8b. The magnets 5a and 5b are provided to face the ferromagnetic material 9. Each of the magnets 5a and 5b is such a permanent magnet as a neodymium magnet.

The lifters 6a and 6b are attached to the hinge member 1. Each of the lifters 6a and 6b may be any given component unless the component does not block magnetic force. Each of the lifters 6a and 6b is made of, for example, a non-magnetic material. A combination of the lifter 6a and the magnet holder 7a is the magnet moving member 11a, and a combination of the lifter 6b and the magnet holder 7b is the magnet moving member 11b.

The first casing 2a and the second casing 2b are respectively provided with a link groove 12a and a link groove 12b. The lifter 6a and the lifter 6b are respectively provided with a link groove 13a and a link groove 13b.

The lifter 6a and the lifter 6b are respectively fit into the link groove 12a and the link groove 12b at one end. The lifters 6a and 6b are rotatably connected to the hinge member 1 at an other end. The lifter 6a is movable in such a manner that the one end of the lifter 6a slides inside the link groove 12a with respect to the hinge member 1. The lifter 6b is movable in such a manner that the one end of the lifter 6b slides inside the link groove 12b with respect to the hinge member 1.

The magnet holder 7a and the magnet holder 7b are respectively fit into the link groove 13a and the link groove 13b at one end. The magnet holders 7a and 7b are rotatably connected to the hinge member 1 at an other end. The magnet holder 7a is movable in such a manner that the one end of the magnet holder 7a slides inside the link groove 13a with respect to the hinge member 1. The magnet holder 7b is movable in such a manner that the one end of the magnet holder 7b slides inside the link groove 13b with respect to the hinge member 1.

Figure 7:
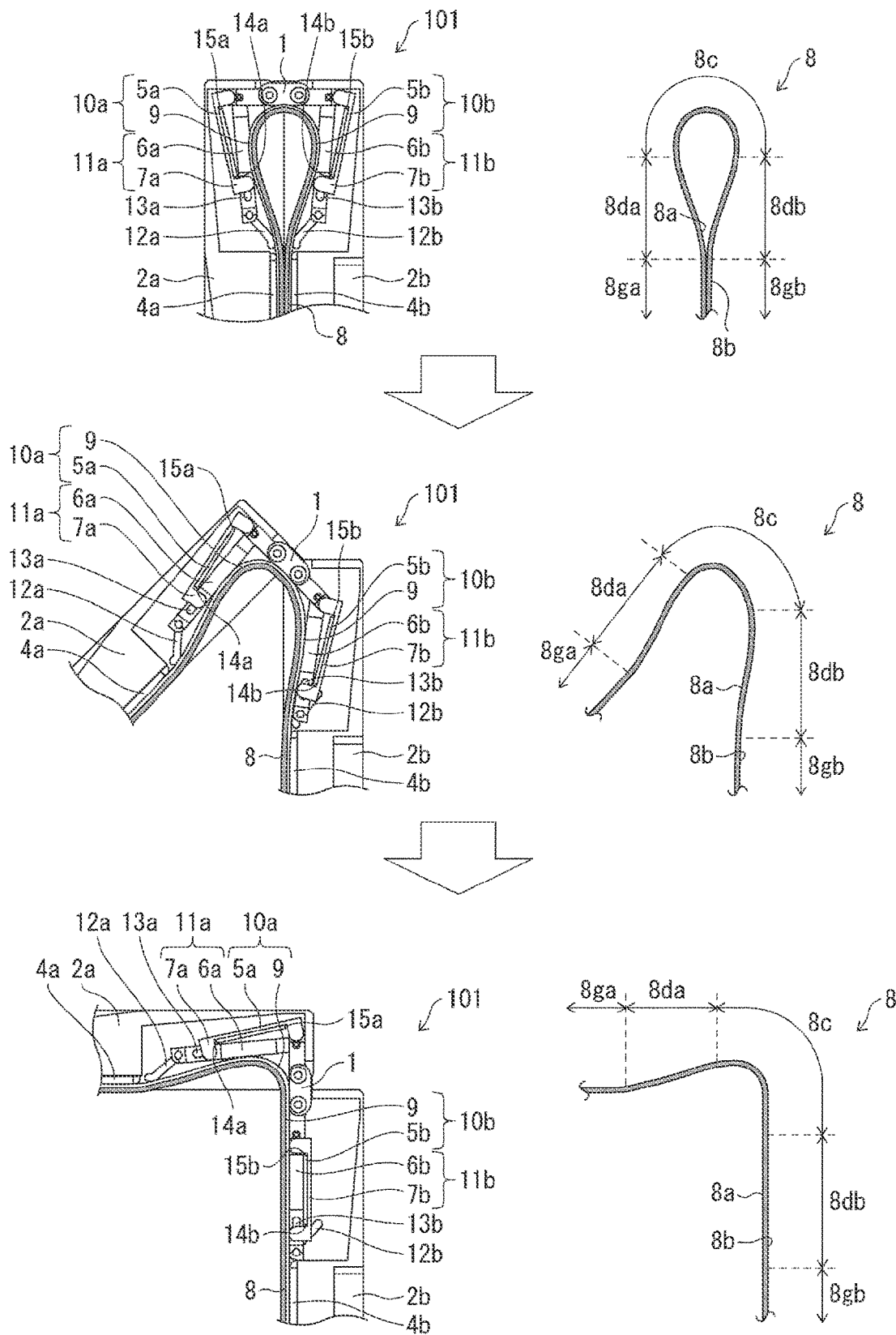
FIG. 7 illustrates cross-sectional views showing an operation mechanism of the pulling member and the magnet moving member in the first half of an operation for shifting the display device according to the first embodiment of the disclosure from a first state to a second state.
Figure 8:
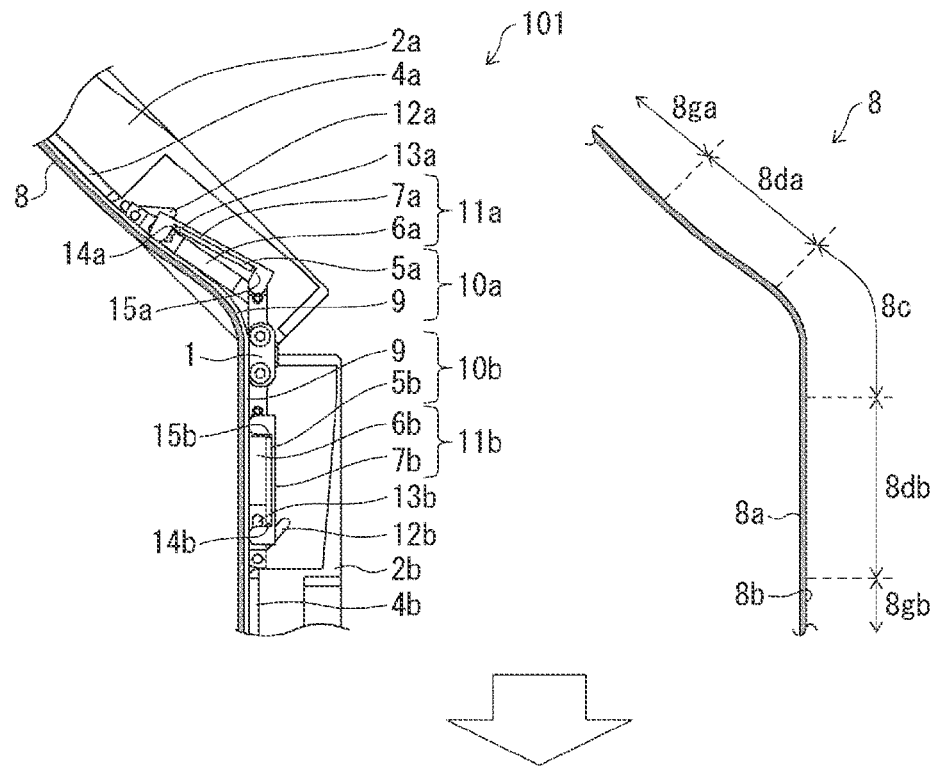
FIG. 8 illustrates cross-sectional views showing an operation mechanism of the pulling member and the magnet moving member in the second half of the operation for shifting the display device according to the first embodiment of the disclosure from the first state to the second state.
Figure 8:
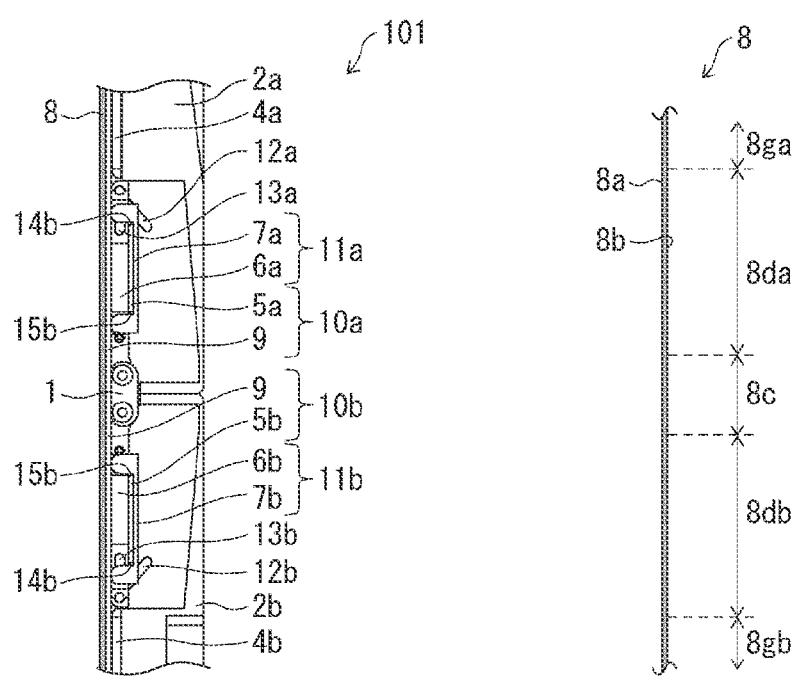

FIG. 7 illustrates cross-sectional views showing an operation mechanism of the pulling members 10a and 10b, and of the magnet moving members 11a and 11b, in the first half of an operation for shifting the display device 101 according to the first embodiment of the disclosure from the first state to the second state. FIG. 8 illustrates cross-sectional views showing an operation mechanism of the pulling members 10a and 10b, and of the magnet moving members 11a and 11b, in the second half of the operation for shifting the display device 101 according to the first embodiment of the disclosure from the first state to the second state. FIGS. 7 and 8 show a case where the display panel 8 is folded into a tear-drop shape. Note that, as described above with reference to FIG. 4, in the first state, each of the second portions 8da and 8db does not have to be bent so that the back surface 8b faces inwards.

In the first state, the casing unit 111 of the display device 101 is folded so that the upper surface of the display panel attaching member 4a and the upper surface of the display panel attaching member 4b face each other using the hinge member 1 as a folding portion. At this time, the magnets 5a and 5b are away from the ferromagnetic material 9. Thus, the magnets 5a and 5b either cease to attract the ferromagnetic material 9 or hardly attract the ferromagnetic material 9. As a result, in the first state, the display panel 8 hardly receives force (load) caused by the presence of the pulling members 10a and 10b and the magnet moving members 11a and 11b. Hence, the display panel 8 bends naturally.

When transition starts from the first state to the second state, the lifters 6a and 6b and the magnet holders 7a and 7b start to move with respect to the hinge member 1 as described above. Thus, the magnet moving member 11a brings the magnet 5a closer to the ferromagnetic material 9, and the magnet moving member 11b brings the magnet 5b closer to the ferromagnetic material 9.

In the second state, the magnet moving member 11a brings the magnet 5a as close as possible to the ferromagnetic material 9, and the magnet moving member 11b brings the magnet 5b as close as possible to the ferromagnetic material 9. Hence, the magnets 5a and 5b attract the ferromagnetic material 9. Specifically, the magnet 5a attracts the ferromagnetic material 9 across from the back surface 8b in relation to the ferromagnetic material 9 (provided with the magnet 5a), and the magnet 5b attracts the ferromagnetic material 9 across from the back surface 8b in relation to the ferromagnetic material 9 (provided with the magnet 5b).

As a result, in the second state, the pulling member 10a provided on the back surface 8b pulls the second portion 8da with the magnet 5a. Thanks to the above configuration, in the second state, the pulling member 10a pulls the second portion 8da from toward the back surface 8b. Such a feature can prevent the distortion 8fa (see FIG. 4) swelling on the front surface 8a in the second portion 8da. Hence, undulation on the front surface 8a can be reduced.

As a result, in the second state, the pulling member 10b provided to the back surface 8b pulls the second portion 8db with the magnet 5b. Thanks to the above configuration, in the second state, the pulling member 10b pulls the second portion 8db from toward the back surface 8b. Such a feature can prevent the distortion 8fb (see FIG. 4) swelling on the front surface 8a in the second portion 8db. Hence, undulation on the front surface 8a can be reduced.

In the transition from the first state to the second state, the magnet 5a is brought closer to the ferromagnetic material 9 sequentially from a distal end 14a to a proximal end 15a in relation to the first portion 8c. That is, in the transition from the first state to the second state, the magnet moving member 11a moves the magnet 5a, positioned far from the first portion 8c, closer to the ferromagnetic material 9. Thus, the first portion 8c is not pulled by the pulling member 10a as much as possible. Hence, load on the first portion 8c can be reduced.

In the transition from the first state to the second state, the magnet 5b is brought closer to the ferromagnetic material 9 sequentially from a distal end 14b to a proximal end 15b in relation to the first portion 8c. That is, in the transition from the first state to the second state, the magnet moving member 11b moves the magnet 5a, positioned far from the first portion 8c, closer to the ferromagnetic material 9. Thus, the first portion 8c is not pulled by the pulling member 10b as much as possible. Hence, load on the first portion 8c can be reduced.

The display device 101 includes: the first casing 2a and the second casing 2b; the display panel attaching members 4a and 4b that secures the display panel 8; the hinge member 1; and the magnet moving members 11a and 11b attached to the hinge member 1. The pulling members 10a and 10b include: the ferromagnetic material 9 to be attracted by magnetic force; and magnets (respectively the magnets 5a and 5b). One of the ferromagnetic material 9 or each magnet is provided to the back surface 8b; whereas, an other one of the ferromagnetic material 9 or each magnet is provided to either the magnet moving member 11a or the magnet moving member 11b.

In the display device 101, the display panel attaching member 4a, the magnet moving member 11a, the hinge member 1, the magnet moving member 11b, and the display panel attaching member 4b are arranged in the stated order. The first portion 8c corresponds to the hinge member 1, and the second portion 8da and the second portion 8db respectively correspond to the magnet moving member 11a and the magnet moving member 11b. As illustrated in FIGS. 7 and 8, in the second state, the display panel attaching members 4a and 4b, the magnet moving members 11a and 11b, and the hinge member 1 have respective front surfaces positioned on the same plane (specifically, a plane facing the display panel 8). As illustrated in FIGS. 7 and 8, in the first state, according to the "tear-drop shape" representing the folding shape of the display panel 8, a distance between the two magnet moving members 11a and 11b is longer than a distance between the two display panel attaching members 4a and 4b.

As illustrated in FIGS. 7 and 8, the magnet moving member 11a and the magnet moving member 11b respectively have the magnet holder 7a and the magnet holder 7b for housing the magnet 5a and the magnet 5b. In the first state, according to the "tear-drop shape" and the operation mechanism of the magnet moving members 11a and 11b, a distance between the two magnet holders 7a and 7b is shorter as the magnet holders 7a and 7b are farther away from the first portion 8c.

The pulling member 10a has: the ferromagnetic material 9 provided to the back surface 8b and the second portion 8da; and the magnet 5a provided across the ferromagnetic material 9 from the back surface 8b and attracting the ferromagnetic material 9. Hence, the magnet 5a attracts the ferromagnetic material 9 provided to the back surface 8b and the second portion 8da, such that the ferromagnetic material 9 and the magnet 5a can serve as the pulling member 10a.

The pulling member 10b has: the ferromagnetic material 9 provided to the back surface 8b and the second portion 8db; and the magnet 5b provided across the ferromagnetic material 9 from the back surface 8b and attracting the ferromagnetic material 9. Hence, the magnet 5b attracts the ferromagnetic material 9 provided to the back surface 8b and the second portion 8db, such that the ferromagnetic material 9 and the magnet 5b can serve as the pulling member 10b.

With reference to the plan view in FIG. 5 and to FIG. 6, the ferromagnetic material 9 is provided across the second portions 8da and 8db in a direction substantially parallel with the back surface 8b and substantially perpendicular (in a horizontal direction DT in the plan view in FIG. 5) to a direction (in a vertical direction DM in the plan view in FIG. 5) in which the first portion 8c and the second portions 8da and 8db are arranged. Such a feature makes it possible to pull the second portions 8da and 8db in a wide range, and to sufficiently prevent formation of the distortions 8fa and 8fb (see FIG. 4).

When the steps illustrated in FIGS. 7 and 8 are carried out in the reverse order, the operation is interpreted to shift the display device 101 from the second state to the first state. In the process of transition from the first state to the second state, the magnets 5a and 5b are brought close to the ferromagnetic material 9; whereas, in the process of transition from the second state to the first state, the magnets 5a and 5b are pulled away from the ferromagnetic material 9.

The display device 101 has the magnet moving member 11a that moves and pulls the magnet 5a away from the ferromagnetic material 9 in the transition from the second state to the first state. As a result, the pulling member 10a stops pulling the second portion 8da in the first state. Such a feature makes it possible to reduce load to be applied on the display panel 8 because of the excessive pulling by the pulling member 10a.

The display device 101 has the magnet moving member 11b that moves and pulls the magnet 5b away from the ferromagnetic material 9 in the transition from the second state to the first state. As a result, the pulling member 10b stops pulling the second portion 8db in the first state. Such a feature makes it possible to reduce load to be applied on the display panel 8 because of the excessive pulling by the pulling member 10b.

The display device 101 includes the casing unit 111 and the display panel 8, and the display device including the casing is foldable.

In the display device 101, each of the two second portions 8da and 8db is provided with a pulling member (respectively the pulling member 10a and the pulling member 10b). Such a feature can prevent formation of respective distortions (respectively the distortion 8fa and the distortion 8fb) for the second portion 8da and the second portion 8db.

On the other hand, if it is not necessary to pay attention to undulation caused on the surface 8a by the distortion 8fa, the pulling member 10a and the magnet moving member 11a acting on the distortion 8fa may be omitted. Likewise, if it is not necessary to pay attention to undulation caused on the surface 8a by the distortion 8fb, the pulling member 10b and the magnet moving member 11b acting on the distortion 8fb may be omitted.

The display panel 8 has the two second portions 8da and 8db positioned to sandwich the first portion 8c. Then, the display panel 8 is secured to the display panel attaching members 4a and 4b provided to the display device 101 and each positioned outside the two respective second portions 8da and 8db while the first portion 8c is positioned in the center; that is, provided in the respective securing positions 8ga and 8gb.

Figure 9:
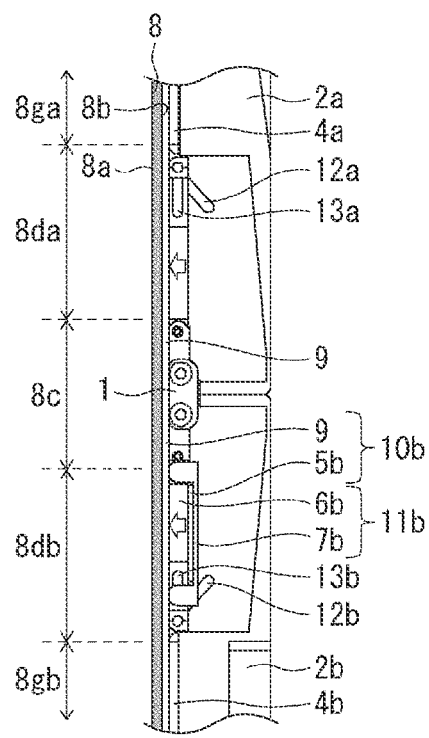
FIG. 9 is a cross-sectional view of a modification of the display device according to the first embodiment of the disclosure.

FIG. 9 is a cross-sectional view of a modification of the display device 101 according to the first embodiment of the disclosure. FIG. 9 corresponds to FIG. 6. As illustrated in FIG. 9, the pulling member 10a and the magnet moving member 11a may be omitted from the display device 101 (actually, the magnet 5a, the lifter 6a, and the magnet holder 7a may be omitted, and the ferromagnetic material 9 is left for the pulling member 10b).

Moreover, the pulling member 10a in the second state may have the magnet 5a and the ferromagnetic material 9 brought into contact with each other. In this case, when the magnet 5a and the ferromagnetic material 9 are detached, the noise made at the moment could be unpleasant to the user. Hence, between the magnet 5a and the ferromagnetic material 9, a sound-insulating sheet that does not block magnetic force may be provided. The sound-insulating sheet may be provided to either the magnet 5a or the ferromagnetic material 9. However, the sound-insulating sheet is provided preferably to the magnet 5a because the feeling of the front surface 8a is unlikely to be lost when the user touches the display panel 8. Such a feature of the pulling member 10a also applies to the pulling member 10b.

Figure 10:
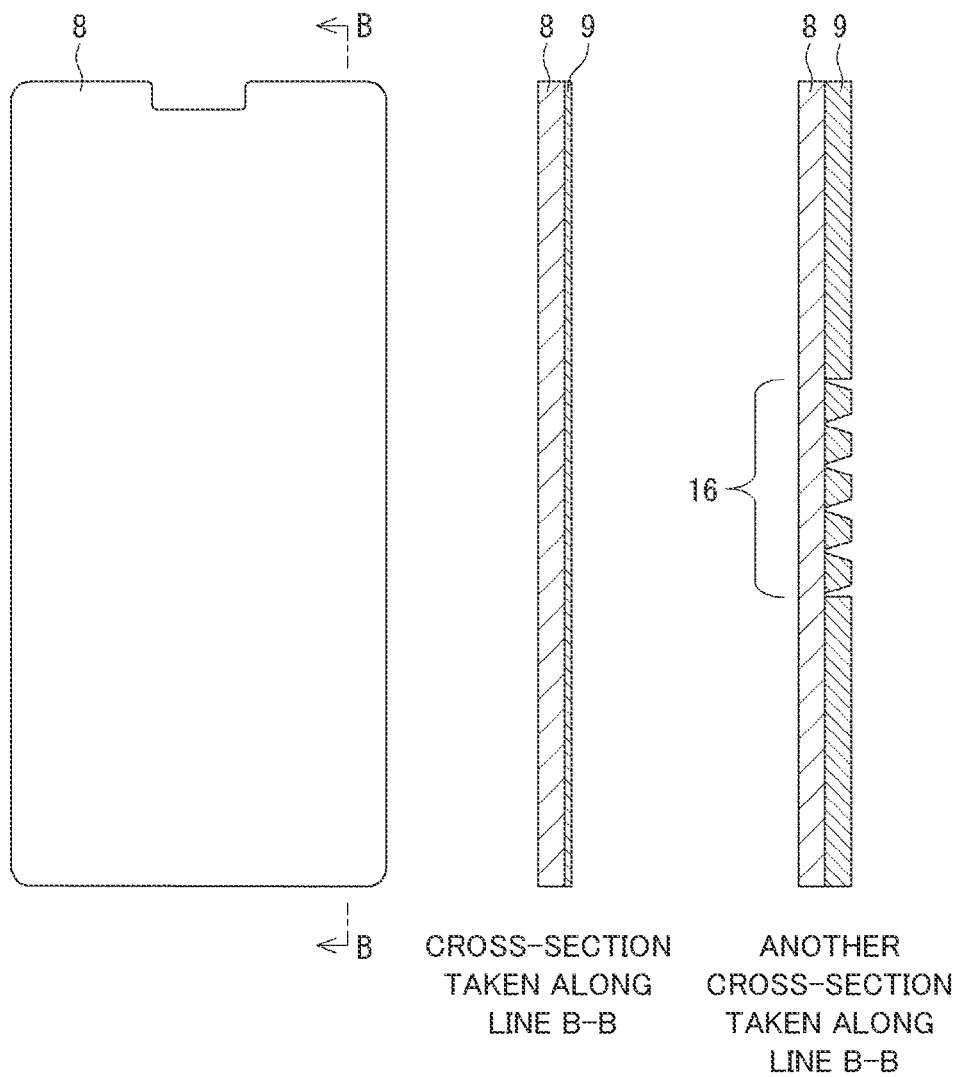
FIG. 10 illustrates a plan view, a cross-sectional view taken along line B-B, and another cross-sectional view taken along line B-B, all of which show specific examples of the display panel and a ferromagnetic material.
Figure 11:
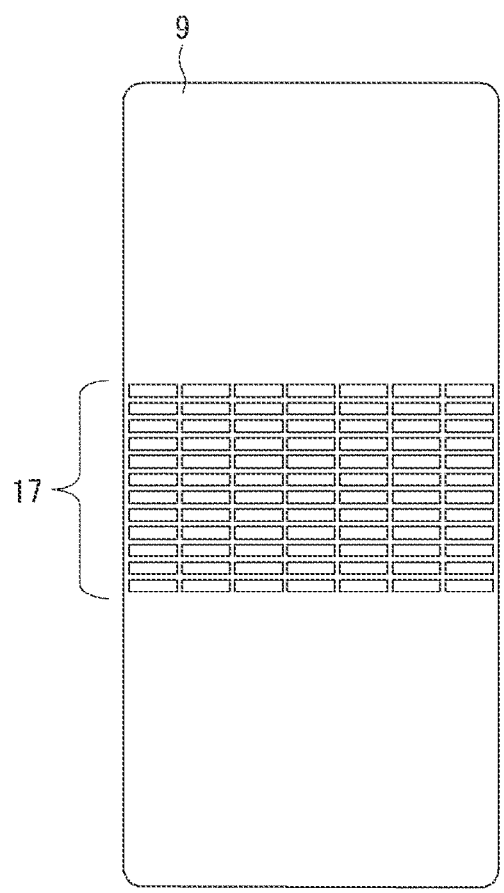
FIG. 11 is a plan view of a specific example of a ferromagnetic material having a living hinge.

FIG. 10 illustrates a plan view, a cross-sectional view taken along line B-B, and another cross-sectional view taken along line B-B, all of which show specific examples of the display panel 8 and the ferromagnetic material 9. FIG. 11 is a plan view of a specific example of the ferromagnetic material 9 having a living hinge.

In FIG. 10, the cross-sectional view taken along line B-B illustrates the ferromagnetic material 9 with no living hinge. On the other hand, in FIG. 10, the other cross-sectional view taken along the line B-B illustrates the ferromagnetic material 9 with a living hinge.

To provide a living hinge to the ferromagnetic material 9 shaped into a flat plate, a portion of the ferromagnetic material 9 is removed so that the ferromagnetic material 9 increases in flexibility. When the whole bendable portion of the display panel 8 in the first state is referred to as a portion 16, an example of the living hinge provided to the ferromagnetic material 9 is, as shown in FIG. 11, a mesh construction provided to a portion 17 included in the ferromagnetic material 9 and overlapping with the portion 16.

When the ferromagnetic material 9 is provided with a living hinge, the user can fold the display device 101 without difficulty even if the ferromagnetic material 9 is increased in thickness.

Each of the magnets 5a and 5b may be an electromagnet.

Second Embodiment

Figure 12:
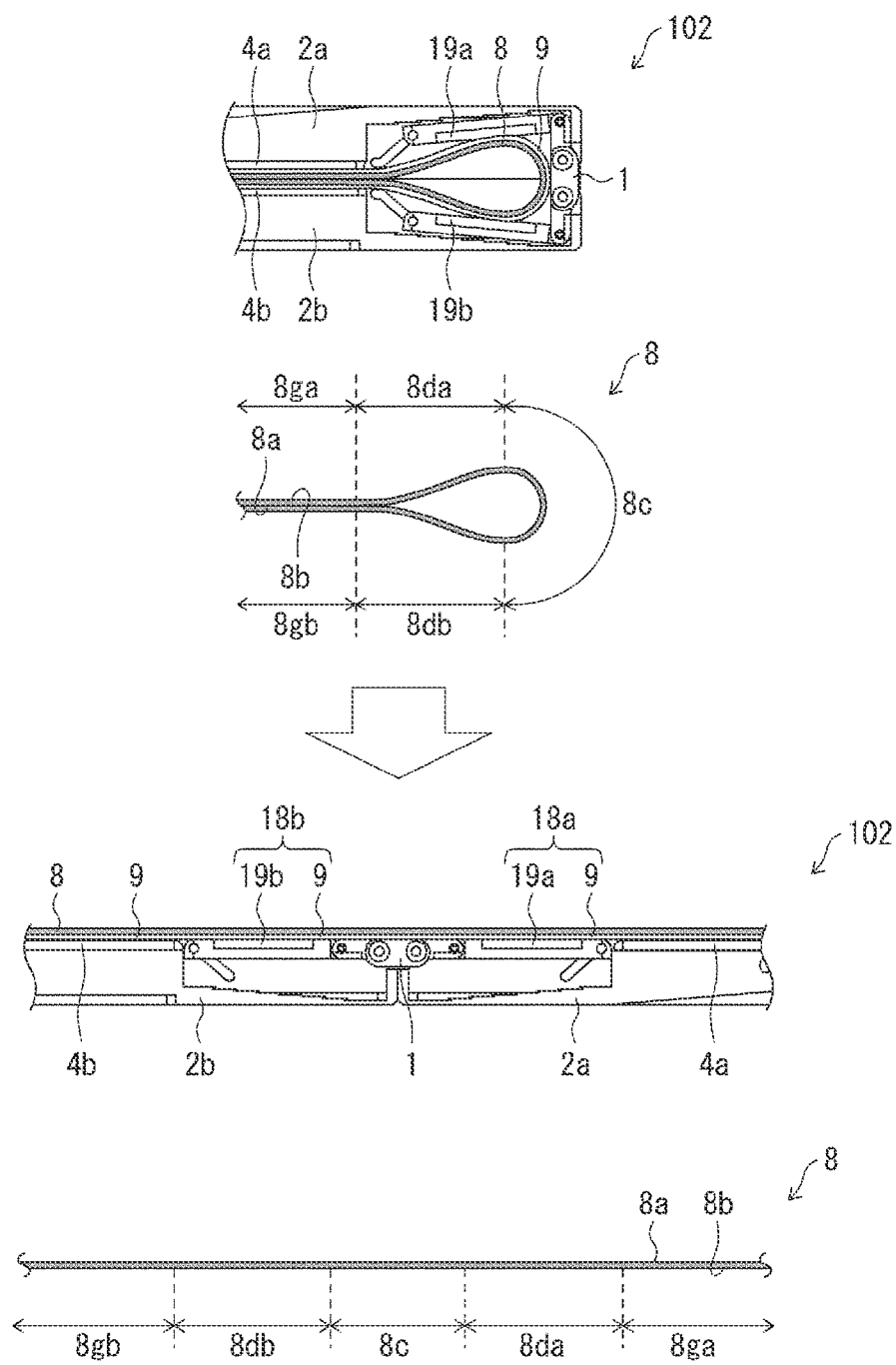
FIG. 12 illustrates cross-sectional views of a schematic configuration of a display device according to a second embodiment of the disclosure.

FIG. 12 illustrates cross-sectional views of a schematic configuration of a display device 102 according to a second embodiment of the disclosure. FIG. 12 shows transition from the first state to the second state. For convenience in illustration, FIG. 12 partially omits illustrations of configurations with no change found between the display devices 101 and 102.

The pulling member may be a mechanism that electrically pulls the second portion 8da and/or the second portion 8db from toward the back surface 8b. This mechanism will be described below.

The display device 101 includes the pulling members 10a and 10b and the magnet moving members 11a and 11b. Alternatively, the display device 102 includes pulling members 18a and 18b. The pulling member 18a is a combination of the ferromagnetic material 9 and an electromagnet 19a. The pulling member 18b is a combination of the ferromagnetic material 9 and the electromagnet 19b.

In the first state, the electromagnets 19a and 19b are not energized. Thus, the electromagnets 19a and 19b either cease to attract the ferromagnetic material 9 or hardly attract the ferromagnetic material 9. On the other hand, in the second state, the electromagnets 19a and 19b are energized, and attract the ferromagnetic material 9.

That is, in the first state, the pulling member 18a does not pull the second portion 8da from toward the back surface 8b; whereas, in the second state, the pulling member 18a pulls the second portion 8da from toward the back surface 8b. In the first state, the pulling member 18b does not pull the second portion 8db from toward the back surface 8b; whereas, in the second state, the pulling member 18b pulls the second portion 8db from toward the back surface 8b. Hence, the pulling member 18a can achieve the same function as the function of a combination of the pulling member 10a and the magnet moving member 11a, and the pulling member 18b can achieve the same function as the function of a combination of the pulling member 10b and the magnet moving member 11b.

The above functions can be achieved by a not-shown energization control unit that controls whether each of the electromagnets 19a and 19b is energized. For example, the energization control unit may detect an angle at which the second casing 2b is open with respect to the first casing 2a, and determine whether the display device 102 is in the first state or the second state according to the detected angle. A threshold value of the angle to distinguish between the first state and the second state may take any given value.

Note that, instead of utilizing energization or non-energization of the electromagnets 19a and 19b to control whether the ferromagnetic material 9 is attracted, for example, static electricity may be utilized to control whether the ferromagnetic material 9 is attracted.

SUMMARY

A display device according to a first aspect of the disclosure includes: a display panel that is flexible and has a front surface and a back surface, the display panel having: a first portion bent so that the front surface faces inwards in a first state in which the display panel is folded; and a second portion positioned outside the first portion while the first portion is positioned in a center; and a pulling member provided to the back surface of the display panel, and pulling the second portion in a second state in which the display panel is unfolded.

Thanks to the above configuration, in the second state, the pulling member pulls the second portion of the display panel from toward the back surface of the display panel. Such a feature makes it possible to prevent a distortion swelling on the front surface of the display panel. Hence, undulation on the front surface of the display panel can be reduced.

In a second aspect of the disclosure, as to the display device according to the first aspect, the pulling member has: a ferromagnetic material provided to the back surface and the second portion; and a magnet provided across the ferromagnetic material from the back surface, and attracting the ferromagnetic material.

Thanks to the above configuration, the magnet attracts the ferromagnetic material provided to the back surface and the second portion of the display panel, such that the ferromagnetic material and the magnet can serve as the pulling member.

In a third aspect of the disclosure, as to the display device according to the second aspect, the ferromagnetic material is provided across the second portion in a direction substantially parallel with the back surface and substantially perpendicular to a direction in which the first portion and the second portion are arranged.

Such a configuration makes it possible to pull the second portion of the display panel in a wide range, and to sufficiently prevent formation of the distortion.

In a fourth aspect of the disclosure, the display device according to the second or third aspect further includes a magnet moving member that moves and pulls the magnet away from the ferromagnetic material in transition from the second state to the first state.

Thanks to the above configuration, the pulling member stops pulling the second portion in the first state. Such a feature makes it possible to reduce load to be applied on the display panel because of the excessive pulling by the pulling member.

In a fifth aspect of the disclosure, as to the display device according to the fourth aspect, in transition from the first state to the second state, the magnet moving member moves the magnet, positioned far from the first portion, closer to the ferromagnetic material.

Thanks to the above configuration, the first portion of the display panel is not pulled by the pulling member as much as possible. Such a feature can reduce load on the first portion of the display panel.

In a sixth aspect of the disclosure, the display device according to the first aspect further includes: a first casing and a second casing; a first display panel attaching member and a second display panel attaching member configured to secure the display panel; a hinge member; and a first magnet moving member and a second magnet moving member attached to the hinge member. The pulling member includes: a ferromagnetic material to be attracted by magnetic force; and a magnet. One of the ferromagnetic material or the magnet is provided to the back surface of the display panel, and an other one of the ferromagnetic material or the magnet is provided to either the first magnet moving member or the second magnet moving member.

In a seventh aspect of the disclosure, as to the display device according to the sixth aspect, the first display panel attaching member, the first magnet moving member, the hinge member, the second magnet moving member, and the second display panel attaching member are arranged in a stated order. The first portion corresponds to the hinge member. The second portion includes two second portions each corresponding to one of the first magnet moving member and the second magnet moving member. In the second state, the first display panel attaching member, the second display panel attaching member, the first magnet moving member, the second magnet moving member, and the hinge member have respective front surfaces positioned on a same plane. In the first state, a distance between the first magnet moving member and the second magnet moving member is longer than a distance between the first display panel attaching member and the second display panel attaching member.

In an eighth aspect of the disclosure, as to the display device according to the seventh aspect, the first magnet moving member and the second magnet moving member have respective magnet holders housing the magnet. In the first state, a distance between the respective magnet holders is shorter as the respective magnet holders are farther away from the first portion.

In a ninth aspect of the disclosure, the display device according to any one of the sixth to eighth aspects further includes a casing unit that is foldable. The display panel has two second portions included in the second portion and sandwiching the first portion. The casing unit includes: the hinge member; and the first casing and the second casing sandwiching the hinge member. The first portion is positioned above the hinge member. One of the two second portions is positioned above the first casing. An other one of the two second portions is positioned above the second casing.

The above configurations can provide a foldable display device including a casing.

In a tenth aspect of the disclosure, as to the display device according to the ninth aspect, the display device includes the pulling member for each of the two second portions.

The above configuration can prevent formation of the distortion in each of the two second portions of the display panel.

In an eleventh aspect of the disclosure, as to the display device according to any one of the sixth to tenth aspects, the display panel has two second portions included in the second portion and positioned to sandwich the first portion. The display panel is secured to the first display panel attaching member and the second display panel attaching member provided to the display device and each positioned outside one of the two second portions while the first portion is positioned in the center.

In a twelfth aspect of the disclosure, as to the display device according to any one of the second to eleventh aspects, the magnet is an electromagnet.

In a thirteenth aspect of the disclosure, as to the display device according to the first aspect, the pulling member is a mechanism that electrically pulls the second portion from toward the back surface.

The above configurations provide a pulling member that electrically pulls the second portion of the display panel from toward the back surface of the display panel.

In a fourteenth aspect of the disclosure, as to the display device according to any one of the first to thirteenth aspects, in the first state, the second portion is bent so that the back surface faces inwards.

Such a configuration makes it possible to achieve more remarkably advantageous effects of reducing formation of the distortion and undulation on the front surface of the display panel.

The disclosure shall not be limited to the embodiments described above, and can be modified in various manners within the scope of claims. The technical aspects disclosed in different embodiments are to be appropriately combined together to implement another embodiment. Such an embodiment shall be included within the technical scope of the disclosure. Moreover, the technical aspects disclosed in each embodiment may be combined to achieve a new technical feature.

The invention claimed is:

1. A display device, comprising:
   a display panel that is flexible and has;
      a front surface,
      a back surface,
      a first portion bent, such that the front surface faces inwards in a first state in which the display panel is folded, and
      a second portion positioned outside the first portion while the first portion is positioned in a center; and
   a pulling member provided to the back surface of the display panel, and configured to pull the second portion in a second state in which the display panel is unfolded,
   wherein:
      the pulling member has a ferromagnetic material provided to the back surface and the second portion, and a magnet that is provided across the ferromagnetic material from the back surface, and that attracts the ferromagnetic material,
      the display device further comprises a magnet moving member configured to move and pull the magnet away from the ferromagnetic material when transitioning from the second state to the first state, and
      when transitioning from the first state to the second state, the magnet moving member moves an end of the magnet, opposite an end positioned far from the first portion, closer to the ferromagnetic material.

2. The display device according to claim 1,
   wherein the ferromagnetic material is provided across the second portion in a direction substantially parallel with the back surface and substantially perpendicular to a direction in which the first portion and the second portion are arranged.

3. The display device according to claim 1, further comprising:
   a first casing and a second casing;
   a first display panel attaching member and a second display panel attaching member configured to secure the display panel;
   a hinge member; and
   a first magnet moving member and a second magnet moving member attached to the hinge member,
   wherein the magnet is provided to either the first magnet moving member or the second magnet moving member.

4. The display device according to claim 3,
   wherein the first display panel attaching member, the first magnet moving member, the hinge member, the second magnet moving member, and the second display panel attaching member are arranged in the stated order,
   the first portion corresponds to the hinge member,
   the second portion includes two second portions, each corresponding to one of the first magnet moving member and the second magnet moving member,
   in the second state, the first display panel attaching member, the second display panel attaching member, the first magnet moving member, the second magnet moving member, and the hinge member have respective front surfaces positioned on a same plane, and in the first state, a distance between the first magnet moving member and the second magnet moving member is longer than a distance between the first display panel attaching member and the second display panel attaching member.

5. The display device according to claim 4,
wherein the first magnet moving member and the second magnet moving member have respective magnet holders housing the magnet, and in the first state, a distance between the respective magnet holders is shorter as the respective magnet holders are farther away from the first portion.

6. The display device according to claim 3, further comprising:
a casing unit that is foldable,
wherein the display panel has two second portions included in the second portion and sandwiching the first portion,
the casing unit includes the hinge member, and the first casing and the second casing sandwiching the hinge member,
the first portion is positioned above the hinge member,
one of the two second portions is positioned above the first casing, and
another one of the two second portions is positioned above the second casing.

7. The display device according to claim 6,
wherein the pulling member includes two pulling members, each corresponding to one of the two second portions.

8. The display device according to claim 3,
wherein the display panel has two second portions included in the second portion and positioned to sandwich the first portion, and
the display panel is secured by the first display panel attaching member and the second display panel attaching member each of which is positioned outside one of the two second portions while the first portion is positioned in the center.

9. The display device according to claim 1,
wherein the magnet is an electromagnet.

10. The display device according to claim 1,
wherein the pulling member is a mechanism configured to electrically pull the second portion from the back surface.

11. The display device according to claim 1,
wherein, in the first state, the second portion is bent, such that the back surface faces inwards.

* * * * *